Figures 1, 2:
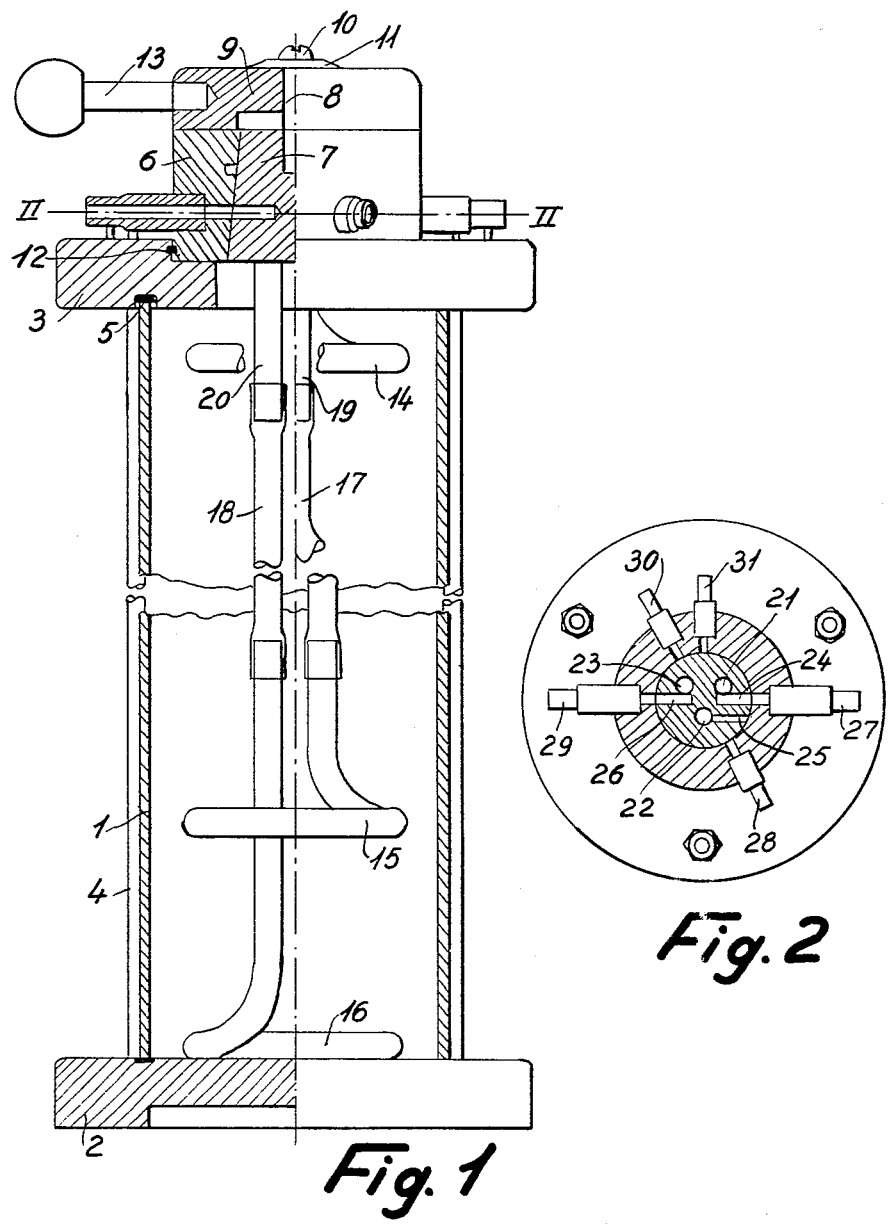

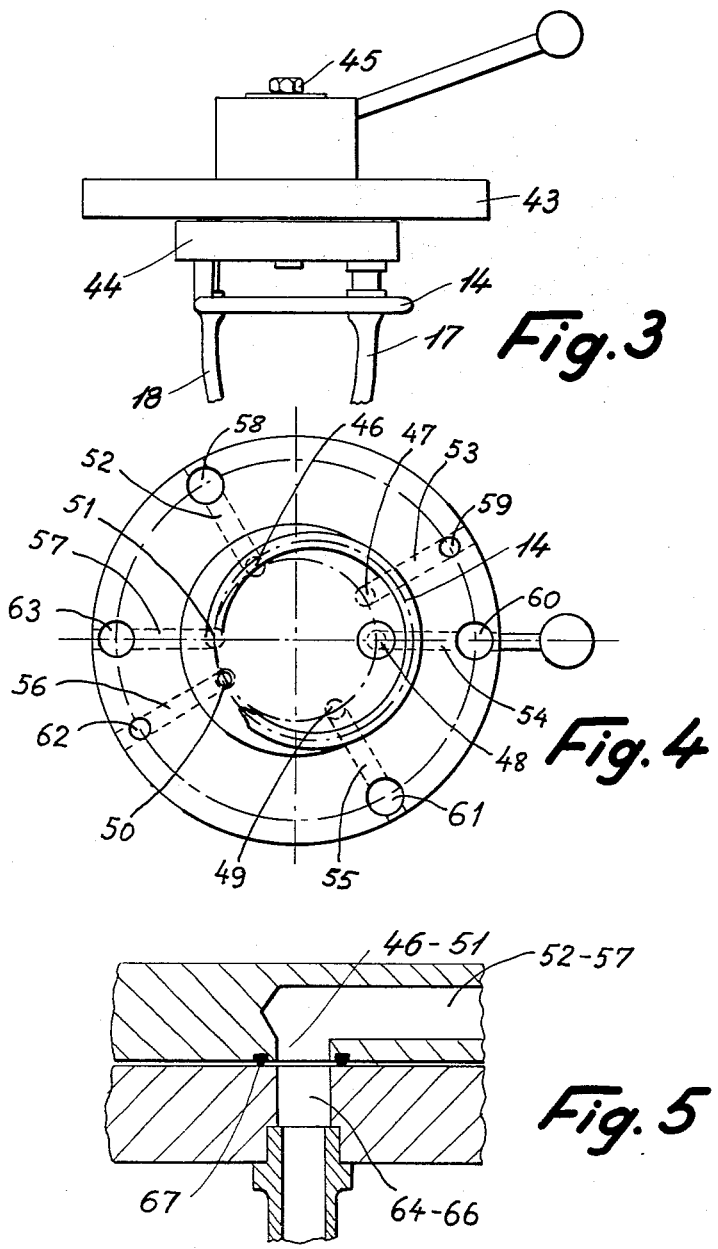

United States Patent Office 3,143,500
Patented Aug. 4, 1964

3,143,500
DEMINERALIZATION COLUMN
Laurits Gudmund Damgaard, Virum, Denmark, assignor to H. Struers Chemiske Laboratorium, Copenhagen, Denmark
Filed Sept. 24, 1962, Ser. No. 225,694
Claims priority, application Denmark Sept. 30, 1961
5 Claims. (Cl. 210—190)

This invention relates to a demineralization column having three distributors located at different levels in the column and adapted to be connected through a multi-way rotary valve with different combinations of inlets and outlets of the column to which the required outer connections may be established.

In a demineralization column of this type, two ion exchanger materials, viz. an anion and a cation exchanger, are used in the form of a mixed bed of these materials. When the demineralization column is used for demineralizing crude water, the water is passed through the column from one end to the other through the mixed ion exchanger material so that it is subjected to both anion and cation exchange during its passage through the column.

However, when regeneration is to take place, the two ion exchanger materials must be separated. For this purpose, the materials are floated in an upward flow of water and then precipitated. After separation and precipitation, in order to effect the regeneration, different regenerating liquids are passed through the two ion exchanger materials, viz. an acid, such as hydrochloric acid through the cation exchanger, and a base such as sodium hydroxide through the anion exchanger. After regeneration washing with demineralized water is effected, and then the two ion exchanger materials are to be mixed again in order to make the demineralization column ready for renewed use. In known demineralization columns, this mixing is frequently performed by blowing air bubbles through the liquid in the column.

As will be apparent from this brief description of the function, a flow of different media is to be established in different ways through the demineralization column in the various phases of operation. This is rendered possible by the described construction with three distributors located at different levels whereby it becomes possible to produce a flow of media from the bottom to the top of the column and vice versa, and also a flow of media from bottom and top towards the middle. The last mentioned system of flow is used for the regeneration because it is possible in this way to pass acid through the cation exchanger, which upon separation of the two materials collects at the bottom, and base through the anion exchanger, which collects at the top. With a view to this function, the middle distributor should preferably be located at a slightly higher level than the surface of separation between the two ion exchanger materials so that there is practically no risk that the base may get in contact with the cation exchanger even though the surface of separation between the ion exchangers will be somewhat displaced during regeneration.

The switch-over of the outer connections to the various distributors in order to carry out the various phases of operation described above is performed by means of the multiway rotary valve. In previously known demineralization columns of the type in question, this control of the flow has been obtained by providing the column with an outer tubing in which one or more cocks are provided. However, such an outer tubing constitutes a relatively expensive complication of the design and production of the column, and the outer tubing is also subject to damage in operation of the column. Also, the connection of the outer tubing to the distributors, which in the known apparatuses of the type in question have been mounted on the cylindrical wall or end walls of the column, constitutes a considerable complication.

It is the object of the invention to devise a demineralization column of the type set forth which is structurally simpler and less expensive to manufacture than the known columns. To this end, according to the inveniton, the multiway valve is mounted at the top of the column with its rotary valve member facing downwards, and the distributors are attached to the bottom face of the rotary valve member in communication with passages in the rotary valve member while all inlets and outlets are provided on the stationary valve member of the multiway valve.

By this arrangement, the outer tubing and the connections from the latter to the distributors are eliminated, because the distributors are directly connected with the rotary valve member both mechanically and in respect of flow so that the distributors are supported by the rotary valve member and thus combine with the latter to form a structural unit which is mounted and dismounted as such and consequently, upon mounting of the rotary valve member at the top of the column, will automatically be caused to assume correct positions in the interior of the column without having to be attached to the latter in any way. The structural arrangement of the rotary valve member becomes simple because all inner connections are established to the rotary valve member and all outer connections to the stationary valve member, which results in the simplest possible arrangement of passages in both the rotary and the stationary valve member. This advantage has been obtained by the mounting of the distributors directly on the rotary valve member so that they are not fixed in the column and are therefore free to rotate together with the rotary valve member.

Since the uppermost distributor is located at a level above the ion exchanger materials, it may take part directly of the rotary movements of the valve members without causing any inconvenience, and this distributor may therefore be rigidly connected with the rotary valve member.

However, as far as the lowermost and middle distributors are concerned, these may, according to the invention, preferably be connected with the rotary valve member through hoses, seeing that these distributors are located in the interior of the bed of ion exchanger materials and might therefore offer some resistance to rotation of the rotary valve member if they were forced rigidly to follow the rotary movement thereof.

In a simple embodiment of the invention, the multiway valve is a cock having the wider end of its conical plug facing downwards.

Alternatively, according to the invention, the stationary valve member may have a plane bottom face with ports communicating with the inlets and outlets of the column, while the rotary valve member will then have a plane top face with ports communicating with the distributors.

The latter embodiment has the advantage that sealing between the valve members may be obtained with greater tolerances than in a cock, particularly because it is possible to obtain sealing by means of special sealing members, which may be obtained, according to the invention, by providing a sealing ring in an annular groove surrounding each of the ports of the stationary valve member.

The invention will now be described in further detail with reference to the accompanying drawing, in which—

FIG. 1 shows a vertical section through one form of a demineralizing column according to the invention, FIG. 2 on a smaller scale a plan view of same with horizontal section through a multi-way cock constituting the multi-way rotary valve in this embodiment, FIG. 3 the top cover with the multiway rotary valve and the uppermost distributor in another form of a demineralization column according to the invention, in side view, FIG. 4 the same in plan view from the bottom, and FIG. 5 on a larger scale a section through parts of the top cover and the rotary valve member in the embodiment of FIGURES 3 and 4.

In FIGS. 1 and 2, 1 is a cylindrical container, e.g. of Plexiglas, which is glued to a bottom disc 2. At its top the container 1 is closed by means of a top cover 3 adapted to be sealingly attached to the top of the container 1 by means of clamping bolts 4. A sealing ring 5 is arranged in a groove of the cover and serves to make a sealing connection between the top cover and the edge of the container 1.

A multi-way cock consisting of a housing 6 and a plug 7 is mounted on the top cover. The plug 7 is held in a conical bore of the housing 6 by means of a screw 8 threadingly engaged with the plug and extending through a bore of a cock cover 9 and having a head 10 abutting a leaf spring 11 arranged on the top of the cock cover. The housing 6 is cemented to the top cover 3 at 12. An operating handle 13 for turning the plug is mounted on the cock cover 9.

Three distributors 14, 15 and 16 are attached to the bottom face of the plug. The upper distributor 14 is rigidly connected with the plug while the middle distributor 15 and the bottom distributor 16 are connected with the plug through rubber hoses 17 and 18 respectively which are connected to pipe stubs 19 and 20 respectively on the bottom face of the plug.

The three distributors consist of circular perforated tubes coated with stockings of gauze. Instead of being circular they may alternatively be star or spiral shaped. It is important that the middle distributor 15 should not be so encumbrant as to prevent movement of the ion exchanger mass during separation and mixing. The uppermost distributor 14 does not have to fulfill special requirements, as long as it has a sufficient passage area and does not allow the ion exchanger particles to escape. The lowermost distributor 16 is the most important one, and should distribute the inflowing liquid uniformly over the bottom. For greater diameter containers a spiral or star shape may therefore preferably be chosen. The distributors 15 and 16 may be rigidly connected with each other as shown in the drawing, though this is not essential.

The three distributors 14, 15 and 16 are connected to three longitudinal passages 21, 22 and 23 respectively in the plug. These three passages communicate through transverse passages 24, 25 and 26 respectively with ports in the conical surface of the plug. The housing of the cock is constructed with ports in corresponding positions, which ports communicate through passages in the housing with pipe stubs 27, 28, 29, 30 and 31 which are intended for being connected through hoses to sources of external media in the following manner:

The pipe stub 27 to crude water, the pipe stub 29 to discharge of demineralized water, the pipe stub 31 to a suction pump, and the pipe stubs 28 and 30 to containers for NaOH and HCl respectively, or (in the case of washing after regeneration) with a container for demineralized water.

An analysis of the connections established between the distributors and the pipe stubs in the various positions of the plug will show that all the flow conditions described above for the various phases of the function of the demineralizing column may be established.

Only three positions of the cock are utilized:

(1) Separating position, crude water in at the bottom, waste water out at the top.

(2) Suction, the plug turned about 60°. Top and bottom distributors are in connection with the NaOH and HCl pipe stubs respectively, the suction stub is in connection with the middle distributor.

(3) Normal position of use, crude water in at the top, pure water out at the bottom, middle distributor and remaining pipe stubs closed.

The quantity of air in the column (the water level should be low during suction and mixing) is controlled by pulling the hose up from the NaOH bottle during suction, whereby air is admitted. In the separating position this air will escape at the top. Mixing is performed by shaking the whole column in the hands, which is easily done when the column is not more than 60 cm. high, and is much quicker than mixing by blowing air through the column.

The groove shown in the plug above the ports of the latter is connected with the suction pipe stub and serves to compensate for incomplete sealing of the cock. The cementing 12 of the housing of the cock in the top cover serves the purpose of protecting the housing against warping under the influence of the tension of the bolts. A rubber like material is used for this cementing.

In one example of an apparatus according to the invention, the filling consists of cation exchanger in a height of 10 cm., anion exchanger in a height of about 22 cm., in total about 32 cm. The remainder of the height of the tube, about 28 cm., is used when the mass is suspended during separation.

Owing to the particular construction of the top cover and distributor unit it also becomes possible to use a wide necked bottle or a big cylinder glass as container of the column by clamping the cover to the collar at the mouth.

In the beforegoing, only the regenerating method in which the chemicals are drawn through the container by means of a water jet pump has been considered. Since the water jet pump is ordinarily not to be used for mixing by the blowing of air through the container, a weak suction effect will suffice, and only water at low pressure is needed. Some water pressure will of course be required, through, since the materials are to be separated by means of tap water (about ⅙ atm. above atmospheric pressure). For the water jet pump for drawing liquids through the container only about the double water pressure will be required, so that both functions may usually be performed without difficulty if tap water is at all available.

If, however, it is desired to let the chemicals flow through the container under the influence of gravity, this is also feasible. One possible method is to connect a hose to the suction stub and to let it extend downwards into a bucket on the floor. The hoses for chemicals are dipped into the bottle which is placed on the table by the side of the column. However, the flow will be slow since $CO_2$ is developed so that the hose will be partly filled with this. The bottles may also be placed at a somewhat higher level than the column but in that case care should be taken that the flow will never be stopped from any of the bottles since one of the liquids may otherwise flow into the wrong ion exchanger.

The embodiment shown in FIGURES 3–5 differs from that of FIGURES 1–2 mainly in that the multi-way cock has been replaced by a plane multi-way rotary valve, the seat portion or stationary valve body of which is formed by the top cover 43 of the column while its rotatable valve body consists of a plane disc 44, which is urged against the bottom face of the top cover 43 by means of a spindle with a nut 45. In the top cover, a number of ports 46, 47, 48, 49, 50 and 51 are provided which communicate through passages 52, 53, 54, 55, 56 and 57 with inlets and outlets 58, 59, 60, 61, 62 and 63 on the bottom face of the top cover, to which inlets and outlets rubber hoses may be connected in order to establish the required external connections.

The rotatable valve body 44 has three through holes 64, 65 and 66, each of which is connected with one of the distributors. Of these, only the top distributor 14 is shown in FIG. 3, and is mounted directly on the bottom face of the rotatable valve body, like in the embodiment of FIGS. 1 and 2, while the two other distributors are connected with the rotatable valve body 44 by means of hoses 17 and 18, like in FIGS. 1 and 2.

As is apparent from FIG. 5, a sealing ring 67 is arranged in an annular groove around each of the ports 46–51. The sealing ring protrudes slightly from the bottom face of the top cover and is engaged by the rotatable valve body. By means of these sealing rings a very efficient sealing may be obtained between the top cover 43 and the rotatable valve body 44 without requiring especially great accuracy of manufacture. The sealing ring also offers the necessary resiliency of the clamping connection between the top cover 43 and the valve body 44, so that it is not necessary to use additional resilient elements for this connection. However, in FIG. 3 a leaf spring is illustrated under the nut 45.

The outer connections to the inlets and outlets of the top cover may be arranged in exactly the same way as described with reference to FIG. 2. However, FIG. 4 shows one pipe stub more than FIG. 2. This extra stub is arranged diametrically opposite to the stub connected to the suction pump. Through this extra stub air may be sucked into the container for the purpose of mixing the regenerated ion exchanger materials, if this mixing method is preferred to shaking the column, or alternatively hydrochloric acid or other chemicals may be sucked through the extra stub if the column is to be cleaned to remove lime sludge or other impurities. A similar extra stub with bore and port might of course also be provided in the multi-way cock of the embodiment of FIGS. 1 and 2.

I claim:

1. A demineralization column comprising a closed elongated container in upright position, a mixed bed of cation and anion exchange materials in said container, three flow distributors located adjacent the top, middle, and bottom, respectively, of said container and each consisting of a hollow member having a plurality of passage openings distributed over the cross section of said container, a multi-way rotary valve mounted at the top of said container, said rotary valve having a stationary valve member and a rotary valve member mounted for rotation about a vertical axis, said rotary valve member facing the interior of said container, said stationary and rotary valve members having cooperating valve faces, conduit means connecting the interior of said top, middle, and bottom distributors via passages of said rotary valve member with angularly spaced ports in the valve face of said rotary valve members, said stationary valve member being constructed with inlets and outlets for connection to a source of liquid to be demineralized, a source of liquid to be used for separating the anion and cation exchange materials, two sources of different regenerating liquids, a regeneration liquids drain-off, a demineralized liquid discharge, and a separating liquid discharge, said inlets and outlets communicating through passages of said stationary valve member with ports in the valve face thereof in positions such as to establish, in cooperation with the ports of the valve face of said rotary valve member, the following flow paths in three different positions of said rotary valve member:

(a) separating liquid in through bottom distributor and out through top distributor;

(b) regenerating liquids in through bottom and top distributors, respectively, and out through middle distributor;

(c) liquid to be demineralized in through top distributor and demineralized liquid out through bottom distributor.

2. A demineralization column as claimed in claim 1 in which the conduit connections between said middle and bottom distributors and said rotary valve member comprise flexible hoses.

3. A demineralization column as claimed in claim 1 in which the multi-way valve is a cock and the rotary valve member is a conical plug having its wider end facing downwards.

4. A demineralization column as claimed in claim 1 in which the valve faces of said stationary and rotary valve members are plane.

5. A demineralization column as claimed in claim 4 in which each of the ports of the stationary valve member is surrounded by an annular groove in which a sealing ring is provided.

References Cited in the file of this patent

UNITED STATES PATENTS

| | | |
|---|---|---|
| 701,452 | Young | June 3, 1902 |
| 2,407,878 | Greetham | Sept. 17, 1946 |
| 2,462,154 | Barnes | Feb. 22, 1949 |
| 3,071,155 | Danley | Jan. 1, 1963 |

FOREIGN PATENTS

| | | |
|---|---|---|
| 34,458 | France | Jan. 22, 1929 |
| 376,994 | Great Britain | July 21, 1932 |
| 569,959 | Great Britain | June 15, 1945 |
| 151,587 | Australia | May 26, 1953 |